US010129280B2

(12) United States Patent
Swann et al.

(10) Patent No.: US 10,129,280 B2
(45) Date of Patent: Nov. 13, 2018

(54) MODULAR EVENT PIPELINE

(71) Applicant: Microsoft Technology Licensing, LLC., Redmond, WA (US)

(72) Inventors: Matthew Michael Swann, Bothell, WA (US); Henri-Bastien Lamontagne, Seattle, WA (US); Zachary Lynn Brown, Seattle, WA (US); Kyle Allan Reed, Bothell, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 57 days.

(21) Appl. No.: 15/265,721

(22) Filed: Sep. 14, 2016

(65) Prior Publication Data

US 2018/0077183 A1    Mar. 15, 2018

(51) Int. Cl.
*H04L 29/06* (2006.01)
(52) U.S. Cl.
CPC ...... *H04L 63/1425* (2013.01); *H04L 63/0227* (2013.01); *H04L 63/20* (2013.01)
(58) Field of Classification Search
CPC .................................................. H04L 63/1425
See application file for complete search history.

(56) References Cited

U.S. PATENT DOCUMENTS

| 7,430,596 | B2 | 9/2008 | Jahromi et al. |
| 7,774,792 | B2 | 8/2010 | Anderson ............... G06F 9/542 709/223 |
| 7,958,340 | B2 | 6/2011 | Hoover et al. |
| 8,380,681 | B2 | 2/2013 | Oltean et al. |
| 8,547,975 | B2 | 10/2013 | Gallant et al. |
| 8,595,837 | B2 | 11/2013 | Antony ................. G06F 21/577 715/736 |
| 8,893,289 | B1 | 11/2014 | Fredinburg et al. |
| 9,112,894 | B2 | 8/2015 | Ramadass et al. |
| 9,274,842 | B2 | 3/2016 | Maltz et al. |
| 9,507,944 | B2 | 11/2016 | Lotem ..................... G06F 21/55 |
| 2003/0196081 | A1 | 10/2003 | Savarda et al. |
| 2007/0261061 | A1 | 11/2007 | Staniford et al. |
| 2013/0097706 | A1 | 4/2013 | Titonis et al. |
| 2014/0157405 | A1 | 6/2014 | Joll et al. |
| 2015/0067857 | A1 | 3/2015 | Symons et al. |

OTHER PUBLICATIONS

Silas Santiago Lopes Pereira et al., ITCM: A Real Time Internet Traffic Classifier Monitor, Proceedings: In International Journal of Computer Science & Information Technology, vol. 6, Issue 6, Dec. 2014. 16pgs.

*Primary Examiner* — Kambiz Zand
*Assistant Examiner* — Thanh Le
(74) *Attorney, Agent, or Firm* — Merchant & Gould P.C.

(57) ABSTRACT

A modular pipeline for event management in a computer environment is provided to enable the high volume of events that may be relevant to the security and stability of that environment to be gathered and analyzed for relevancy in a lower volume format. The modular pipeline enables event collection to meet various use cases so that the data comprising the events may be held and transmitted in a reduced volume format so that the relevancy of the events, rather than the events themselves, may be used by various systems with less transmission overhead and greater responsiveness. Aspects of the modular pipeline streamline and optimize the performance of a computing device within a network environment and provide for additional analytics of that environment.

20 Claims, 4 Drawing Sheets

MODULAR EVENT PIPELINE

BACKGROUND

In a network environment, determining whether a security breach has occurred may require a detailed analysis of several devices and their security logs, which store already executed actions—often making security a reactive instead of a proactive service. When securing the network as a whole, smaller networks may attempt to aggregate communications to or from the several devices comprising the network at a central security center for analysis of the network's overall health, which requires significant bandwidth, processing resources, and storage resources to be used within the network; all of which increase exponentially as the number of devices comprising the network grow. To use a central security center, especially in larger networks, administrators often compromise on the amount of data collected; leaving malicious parties routes to exploit vulnerabilities in the network that do not leave a trace of their presence.

Similarly, when observing the stability of applications running on a machine, several events may be generated by each of the applications which may impact the stability of the application itself or other applications running on the machine. Due to the high volume of potentially significant events occurring on the machine, developers may miss out on monitoring potentially relevant events, especially because some events within the network are only meaningful when observed in aggregate or in association with another event.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

As each network has different security needs and process profiles, due to varying sizes and number of interconnections between devices comprising the networks, a modular event pipeline and systems and methods for the use thereof are provided in the present disclosure. The event pipeline is modular to adjust to the needs of the network on which it is deployed and is able to aggregate events at the server or network level in multiple configurations so that less data need to be transmitted from the individual servers to a central system (e.g., a security manager) to implement threat detection and process improvement procedures. The pipeline improves the efficiency of the network and the component computing devices by improving the accuracy of threat detection and thereby improves the response to threats to remove malicious programs (which consume storage space, processing resources, and bandwidth), block/ignore inbound malicious communications, etc. The pipeline provides a modular arrangement of services that reduce the amount of data that need to be passed between processes and devices within the network, which may provide a more accurate view of processes running on a given device or of the network as a whole.

The pipeline is comprised of various modules, which may be enabled, disabled, added, or removed to suit the needs of a given network. Modules fall into at least one of three classes: consumers, which read events in the pipeline and perform a corresponding action; producers, which listen for and emit events into the pipeline for potential consumption therein; and propagators, which read high-volume events, perform analysis, aggregate/filter high-volume events to produce a derived event or a low-volume event to emit back into the pipeline for consumption.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
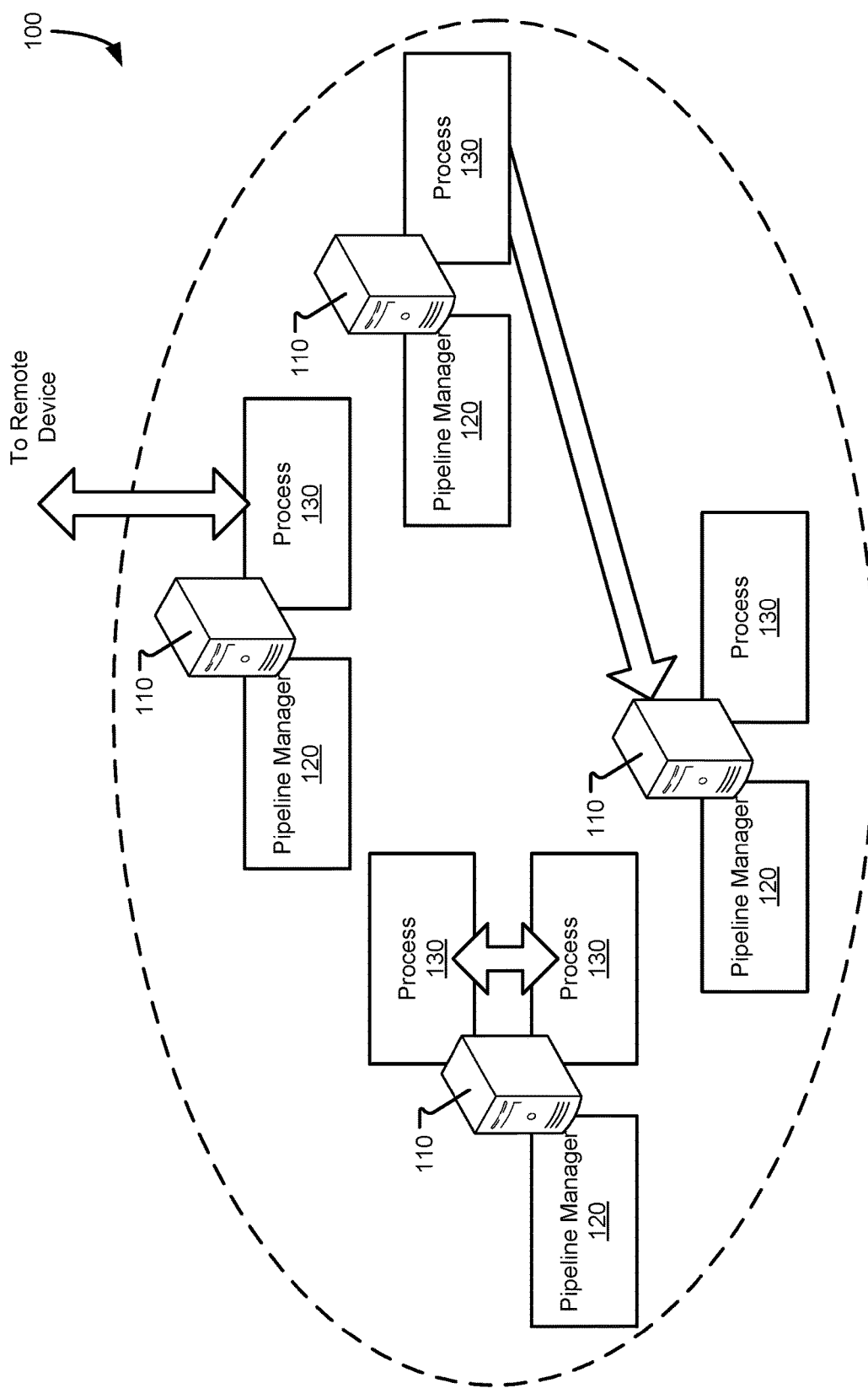
FIG. 1 illustrates an example network environment in which the systems and methods of the present disclosure may be practiced.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

A modular security pipeline is discussed for use in a network that improves the functionality of the devices comprising the network and the network itself by reducing the resources (memory, processing, and bandwidth) needed to detect security threats and improving the accuracy of detection. Individual modules are deployed at collection or consumption points in the network, rather than at the edge servers and a central security service, to collect and consume events (and aggregations thereof) at the affected systems so that greater detail in high-volume events can be tracked, correlations between events may be established, and less bandwidth is used to communicate events within the network.

FIG. 1 illustrates an example network environment 100 in which the systems and methods of the present disclosure may be practiced. As illustrated, a server 110, which may be one of a plurality of servers in the example network environment 100, is running a pipeline manager 120 and process 130, which may be one of a plurality of processes running on the server 110. In various aspects, each server 110 in the example network environment 100 individually runs a pipeline manager 120 and its own processes 130, but some servers 110 not running a pipeline manager 120 may also be part of the example network environment 100. The process 130 may be any application or program running on the server 110, and may direct communications to destinations within the example network environment 100 (e.g., another server 110, a gateway, a domain controller) or to a destination outside of the example network environment 100, or to another process 130 running on the same server 110.

The server 110 is illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, and mainframe computers. The hardware of these computing systems is discussed in greater detail in regard to FIG. 4.

The pipeline manager 120 is a specialized process 130 or plurality of processes 130 that are run on an individual server 110 and may have additional processes added or removed from the plurality of processes 130 modularly. The pipeline manager 120 is discussed in greater detail in regard to FIG. 2. The pipeline manager 120 provides an orchestrator and a health management service to manage the flow of data within the pipeline and correct or address any hangs, program crashes, or exceptions thrown by modules within the pipeline. In some aspects, the pipeline manager 120 is part of the process 130 being monitored, so that the components of the pipeline may easily signal health issues to the pipeline manager 120.

Figure 2:
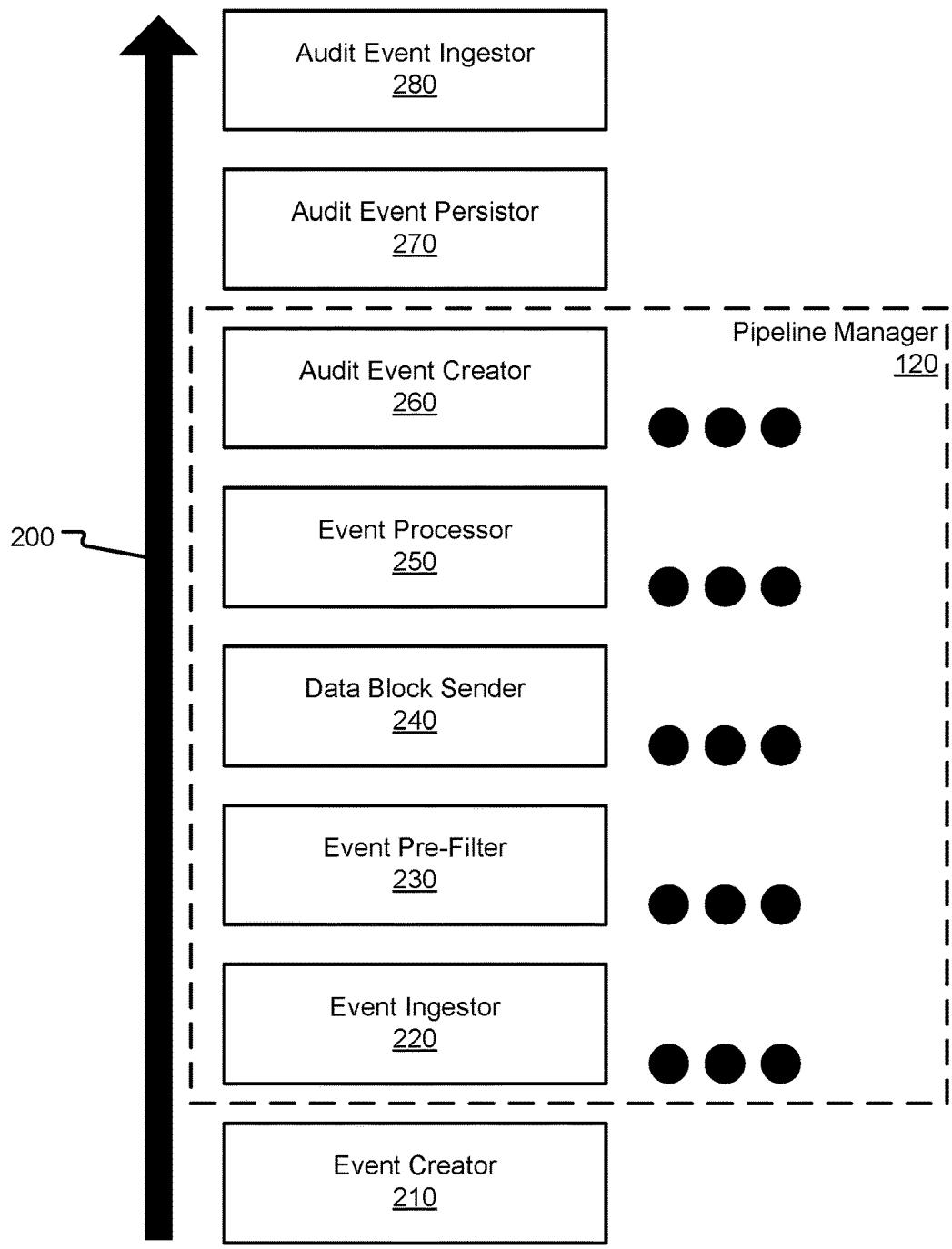
FIG. 2 illustrates an example flow of a modular event pipeline.

FIG. 2 illustrates an example flow 200 of a modular event pipeline. The flow 200 illustrates a directional processing of events occurring on a server 110 and the relative positions of modules within the modular event pipeline relative to the flow 200. As will be appreciated, the modules shown in FIG. 2 are provided as illustrative examples; the illustrated modules may be omitted or replicated in various implementations, and additional modules may be added in various implementations without departing from the present disclosure.

Modules fall into at least one of three classes: consumers, which read events in the pipeline and perform a corresponding action; producers, which listen for and emit events into the pipeline for potential consumption therein; and propagators, which read high-volume events, perform analysis, aggregate/filter high-volume events to produce a derived event or a low-volume event to emit back into the pipeline for consumption. For example, the generation of each network packet or command line instruction on a server 110 may be a separate event. Each of these modules may be a separate process 130 or a single process 130 may provide multiple modules in different aspects. Within the flow, each of the illustrated modules receives (or queries for) data from the module illustrated below it and passes to (or has its data collected by) the module illustrated above it in the flow 200.

The event ingestor 220, event pre-filter 230, data block sender 240, event processor 250, and audit event creator 260 are illustrated as part of the pipeline manager 120, and one or more of each of these modules may be present within the pipeline manager 120 so that the pipeline may be modularly adjusted to meet the needs of the network 100 and its administrators. In various aspects, these modules act as producers for modules upstream of them in the flow 200, consumers of modules downstream of them in the flow 200, and propagators which may have connections to other modules positioned upstream, downstream, or cross-stream in the flow 200 with various connections between those modules. The connections between modules may include a queue that allows the modules to buffer incoming events which cannot be processed immediately, which smoothes out bursts of events without those events being dropped and allows module communications to be asynchronous and/or multithreaded. If the queue fills up and events are dropped, the module may report a fault to the pipeline manager 120 or a separate component which is responsible for restarting the module or restarting the pipeline if it becomes unhealthy. The pipeline may monitor its own health, such as CPU usage or memory usage, and terminate or adjust processing in the pipeline as needed to reduce the impact on the system.

As will be appreciated, although only one of each module is illustrated in FIG. 2, one of ordinary skill in the art will recognize that multiple event creators 210 (producers), audit event persistors 270 (propagators), and audit event ingestors 280 (consumers) may be present on a single server 110 and may be connected in multiple ways via the pipeline. Similarly, each of the modules illustrated as part of the pipeline manager 120 may receive data from more than one earlier module in the flow 200 and may output data to more than one module in the flow 200.

The definition and ordering/connection of modules may be specified in source code or in a declarative configuration file such as an Extensible Markup Language (XML) definition, which is used to assemble the pipeline at runtime. The pipeline may be reconfigured while the processes being run and monitored are active, and without recompiling the pipeline manager 120 or the individual modules. The pipeline may monitor this configuration file and immediately reconfigure itself to include, exclude, or establish or terminate terminations between the modules in response to changes in the configuration file. The pipeline may take steps to protect itself against loading modules that comprise malicious code, for example, by only loading modules that reference or comprise signed DLLs or verifying the hashes of the modules or referenced DLLs that are referenced in the configuration file.

The event creator 210 represents a process running on the server 110 that has been designated for monitoring and/or that has produced an event that has been designated for monitoring. The events produced on the server 110 by the event creator 210 are observed and brought into the pipeline by an event ingestor 220 that listens for specific events and/or for events from a specific process 130. For example, a process 130 that is a new version of an application may be designated for monitoring, so that all of its events are noted by the event ingestor 220, communications made to devices outside of the network 100 may be noted by the event ingestor 220 independently of the process 130 making the outbound communication, or outbound communications from a given process 130 may be noted by the event ingestor 220.

The event ingestor 220 listens for designated events, which may be extremely high in volume for a given event creator 210 and even higher when multiple event creators 210 are active on the server 110. The event pre-filter 230 is operable to filter the events observed by the event ingestor 220 into a subset to reduce the number of events that are handled by the data block sender 240. For example, when two event ingestors 220 both observe the same event (e.g., one monitoring a specific process 130 and other observing specific events) the event pre-filter 230 is operable to filter the multiple observations to a single observation. Similarly, the event pre-filters 230 may funnel the events into separate data block senders 240 so that events of type A and events of type B are differentiated for later processing based on filtering criteria for which events are relevant to which event processors 250. As will be appreciated, depending on the implementation, more or fewer event ingestors 220 and event pre-filters 230 may be included in the pipeline, and an event ingestor 220 may be provided along with one or more event pre-filter 230 within a single module or without an event pre-filter 230.

One example of how the flow 200 aggregate high-volume events to produce a lower volume event is via traces. Traces track the times at which events occur, and are grouped by the data block sender 240 for consumption by one or more event processors 250. An event processor 250 receives one or more traces from associated data block senders 240 to monitor events across times via an event object that aggregates the various events received over time (and at a lower volume for improved consumption) so that an associated audit event creator 260 can produce audit events when the event object satisfies an audit criterion.

For example, a paired event processor 250 and audit event creator 260 (which may be provided via a single module or process 130 within the pipeline) may receive a trace of all communications made to devices outside of the network 100 to determine whether a given set of those communications are potentially a beacon signal to a malware control server. The event processor 250, by observing the individual communications via the trace, is operable to determine a standard deviation for times between successive messages for the aggregated communications over time. The running calculation for the standard deviation is compared against criteria defining a beacon signal (e.g., a standard deviation below a periodicity threshold, but above a sanity threshold).

In another example, a paired event processor 250 and audit event creator 260 may receive a trace of all commands from an administration tool (such as, for example, the PowerShell® command line shell, available from Microsoft Corp. of Redmond, Wash. or the BASH command line shell available from the GNU project) to determine whether a series of command/target pairs are indicative of malicious use. The series of instructions are aggregated into an event object by the event processor 250 to track which users or process use which commands, and the audit event creator 260 may compare those events (or event/user pairs) to determine when a potentially malicious instruction has been given.

In yet another example, a paired event processor 250 and audit event creator 260 may receive traces for network events and commands to determine when data are being exfiltrated from the network 100 (e.g., private data are being exposed to a remote device by a malicious process 130 on the server 110). The event processor 250 may maintain an event object that tracks the amount of data transmitted to a destination from a given source over a period of time via multiple transmission events for the audit event creator 260 to determine whether the destination is unknown or the amount or origin of data transferred to the destination is suspicious.

The output from the audit event creators 260 may be stored in various data objects as part of the pipeline or may be transmitted to another module (on the same or a different server 110) for further analysis; the audit event creators 260 may themselves be treated as event creators 210. In aspects where the results from the audit event creators 260 are stored, those results are stored in an audit event persistor 270. Examples of audit event persistors 270, include: an event log, a periodicity object dictionary, a netflow object dictionary, and a command object dictionary, but are not so limited. The audit event persistors 270 allow for the audit event creator 260 to update individual event objects as new data become available; preserving system memory. The audit event persistors 270 also allow for an audit event ingestor 280, such as, for example, a security information and event management (SIEM) service (or an Application Program Interface (API) or other adapter therefor) or an application health and debugging service to consume the results of the pipeline, which reduce the number of events that the services consume and provide greater context to the data provided to the services. In various aspects, the services that consume the audit events persisted by the audit event persistors 270 may run on the same server 110 as where the event originated, or may run on a centralized server 110 that either pulls the results from the audit event persistors 270 or has the results pushed to that server 110 by the originating server 110.

The flow 200 of the pipeline thus is operable to improve the functionality of the computing devices on which it is implemented, by allowing for a large number of individual events, that may be individually insignificant, to be aggregated to provide a significance to an administrator of that computing device. More data can be collected for review, while storing less data, by filtering and aggregating the events via the described flow 200.

To illustrate the operation of the flow 200, consider a first example where a given process 130, as an event creator 210, initiates events of: making a series of communications with a remote device, executing several commands on the server 110, and transmitting large quantities of data to the remote device. One or more event ingestors 220 listening to the given process 130 or for events such as those initiated by the process 130 observe the events noted above, and one or more event pre-filters 230 filter relevant events from the series of events observed. For example, a network trace event pre-filter 230 may note the times and source/destination pairs at which and at what volumes inbound and outbound communications are made, while a process trace event pre filer pre-filter 230 may note those events that relate to commands taking place on the sever server 110 running the process 130 (e.g., start/termination times for the process 130, calls to other processes 130).

These filtered events are then formatted into data blocks for traces (e.g., data points within a traceroute) by data block senders 240, such as, for example, a network trace producer data block sender 240 associated with the network trace event pre-filter 230 and a process trace producer data block sender 240 associated with the process trace event pre-filter 230. The data blocks produced by the data block senders 240 are made available to (transmitted to or listen to by) one or more event processors 250 that have been configured in the pipeline's flow 200 to produce an event object via the traces to aggregate multiple events into a single object that an associated audit event creator 260 can compare to various criteria to determine when an audit event should be created.

A first example of an event processor 250 and audit event creator 260 pair is a beacon detector. The beacon detector produces an event object of a periodicity object in a periodicity object dictionary acting as an audit event persistor 270, which may be stored as part of a security event log. The beacon detector receives data blocks that indicate the identifier of a process 130 making an outbound communication, the address of the remote device to which the communication is bound (e.g., an IP address and port number pair), and a time at which the communication was made, which may be received from a network trace producer data block sender 240. These data are used to build and continually update a periodicity object associated with the tuple of process identifier and destination address, so that whether the communications are strongly or weakly periodic (and indicative of being a beacon for a malware application or not) may be determined over a period of time. The standard deviation of the time between successive communications for a given tuple may thus be kept as a running calculation in the periodicity object so that the individual events do not need to be stored; reducing the amount of memory storage required for the server 110. When the standard deviation drops below a threshold, and the tuple is not known to be safe (i.e., not a process 130 pre-approved to use a beacons signal), the periodicity object or an alert may be passed to an audit event ingestor 280 by the audit event creator 260, or an audit event ingestor 280 may collect periodicity objects whose standard deviation falls below a threshold and are not associated with known-safe tuples.

A second example of an event processor 250 and audit event creator 260 pair is a command line logger. A process trace data block sender 240 provides command line events, a process identifier, and a user associated with initiating the command line event (which may be a human user or another process 130) to the command line logger to compare the commands to those known to be potentially exploitable by a malicious party. For example, commands from a blacklist or those known to be used by malware tools (e.g., Power-Sploit) or are otherwise potentially dangerous may be identified by the command line logger so that a command object may be added to a command object dictionary. The command objects or alerts may be passed to an audit event ingestor 280, or an audit event ingestor 280 may collect command objects so that users associated with the blacklisted commands may be automatically logged out of the system, quarantined, or marked for observation.

A third example of an event processor 250 and audit event creator 260 pair is a netflow logger. The example netflow logger receive traces from both a network trace producer and process trace production data block senders 240 to note abnormal data transmission patterns to remote devices. For example, a netflow object may be updated by the netflow logger when a given amount of data from a given process 130 is transmitted to a given remote device within a time period from the network trace, and updated from the process trace to identify a size of the transmission or activities/commands associated with the process 130 prior to transmission or post transmission (e.g., keylogging, cache clearing, co-pending transmission commands, process termination commands). For example, a malicious process 130 may attempt to coincide its transmissions with a high volume flow of traffic of a legitimate process 130 so that a human user does not see a noticeable slowdown in traffic when the malicious process 130 begins transmission, and a netflow logger may note that the volume of data transmitted for a given source/destination pair stays below a given level until another process 130 begins transmission. Alternatively, the netflow logger may track average transmission sizes so that results from a beacon detector may be correlated to using a standard size beacon frame.

Figure 3:
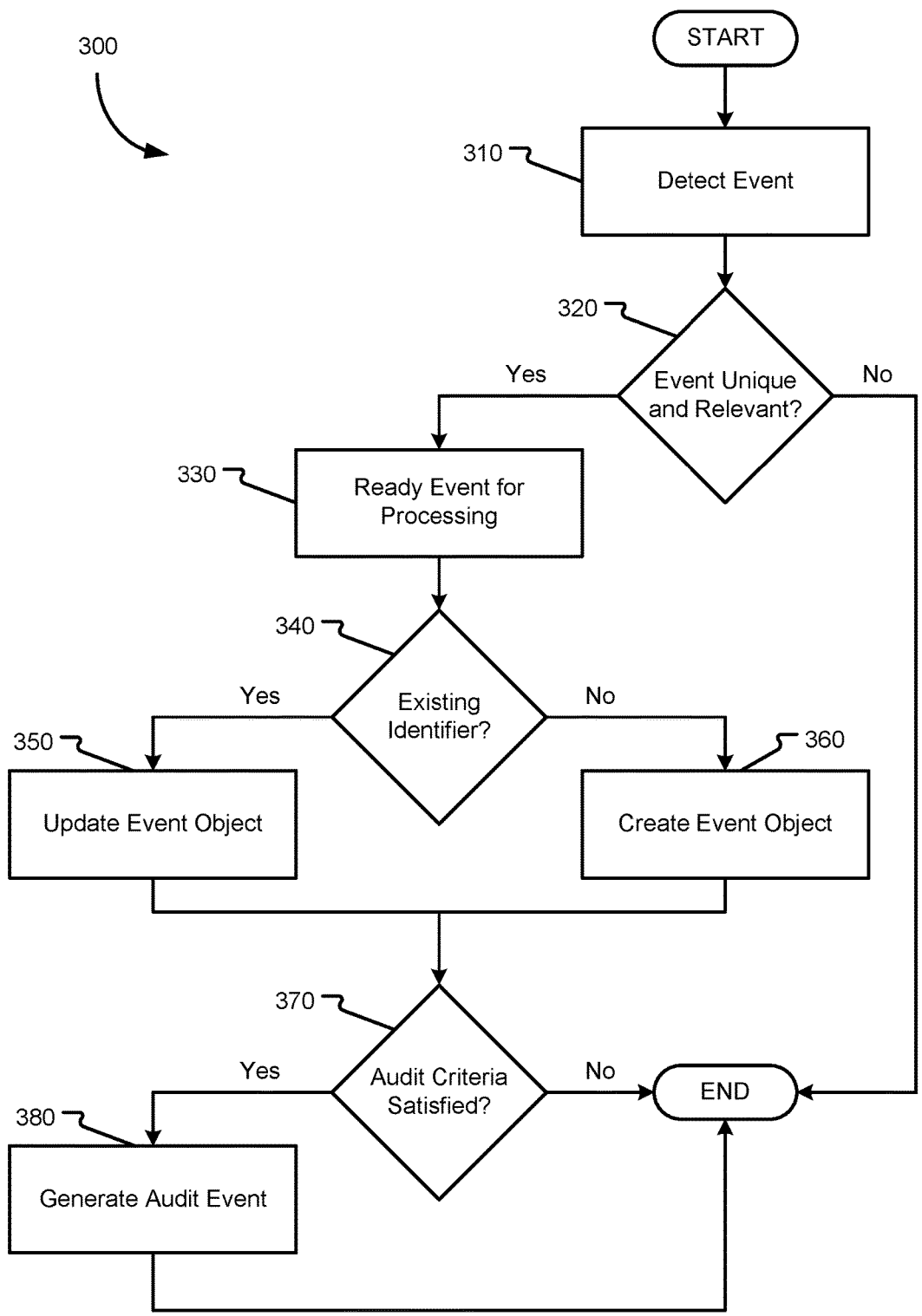
FIG. 3 is a flow chart showing general stages involved in an example method for processing a flow of events in an event management pipeline.

FIG. 3 is a flow chart showing general stages involved in an example method 300 for processing a flow 200 of events in an event management pipeline. As will be appreciated, because the pipeline is modular, in different deployments, the operations outlined in example method 300 may be varied in practice as various modules may be added to handle new events or handle events in new ways, and modules may be removed to cease handling existing events or cease handling events in a given manner.

Method 300 begins when an event listener, such as an event ingestor 220 detects a corresponding event from a process 130 running on the server 110. Method 300 proceeds to DECISION 320, where it is determined whether the event observed is both unique and whether the event is relevant. For example, when two event ingestors 220 detect the same event, one detection will be discarded, as only one event has been detected, albeit by multiple listeners. Similarly, events or detections may be discarded by an event pre-filter 230 so that known-safe or whitelisted events (e.g., a communication with an operating system update service) may be ignored. Alternatively, an event pre-filter 230 may select from the events detected to pass chosen events via a data block sender 240 to an event processor 250.

At OPERATION 330 the events received by or collected by the event processor 250 are readied for processing. As will be appreciated, because an event may be passed to multiple event processors 250 in parallel, a single event may be handled separately by multiple event processors 250. For example, an event for an outbound communication may be handled by an event processor 250 used to determine whether the communication is part of a beacon signal and by an event processor 250 used to determine whether the communication is transmitted to a suspicious destination. The relevant details for the event are provided to the event processor(s) 250, and any details regarding the event that are not used by the event processor 250 may be removed when provided to the event processor 250 or ignored when the events are retrieved by the event processor 250.

When processing the event, at DECISION 340 the event processor 250 determines, based on the data block passed to it, whether the identifying information passed in the block relates to an event object that has already been created by the event processor 250 or that a new event object will need to be created for the identifying information. For example, the event processor 250 may use a process identifier and a command identifier as identifying information for command event objects. In another aspect, an event processor 250 may use a process identifier and a destination address (including IP address and port number) as identifying information for outbound communication event objects. The event processor 250 will query an audit event persistor 270 (e.g., an object dictionary) to determine whether an event object exists that includes matching identifying information to the event contained in the trace. In response to identifying an existing event object from the audit event persistor 270, method 300 proceeds to OPERATION 350. Otherwise, method 300 proceeds to OPERATION 360 to create an event object for the identifying information.

At OPERATION 350 the persisted event object matching the identifying information is updated. The event processor 250 uses the information from the event to update the matching event object. For example, with an event object for beacon detection, including running calculations for an mean delay between messages for a given source/destination pair and a running standard deviation calculation, the time information from the event are used to update the running calculations for the given source/destination pair. In another example, with an event object for netflow management, including running calculations for mean data transmitted for a given source/destination pair, the time information and packet (or frame) size information from the event are used to update the running calculations. In yet another example, with an event object for command line tracking, the identities of issued commands are compared against lists of potentially risky or dangerous (from a network security perspective) commands to build a running count of commands issued by a given user or process 130 that may expose the server 110 or the network 100 to a malicious party. In addition to the information received from the traces, the event objects may also include one or more counters to track the number of times a given event object or event type has been observed, which will be incremented accordingly. Method 300 then proceeds to DECISION 370.

At OPERATION 360 a new event object is created using the identifying information received in the event and the other information to create a baseline for the event object that may be updated when a subsequent event with the same identifying information is seen in the future. In various aspects, the event object is added to an associated dictionary for future lookup via the identifying information (e.g., as a key value or values for the object). As will be appreciated, the new event objects may be created in response to the event processor 250 never having seen an event with the given identifying information, or a previously created event object having been removed or deleted from the audit event persistor 270. For example, an event object may only be persisted for a set period of time (e.g., n minutes, n days), the audit event ingestor 280 may remove/delete event objects when consuming them, or the pipeline manager 120 may remove/delete objects in response to a process 130 associated with those event objects terminating. Method 300 then proceeds to DECISION 370.

Proceeding to DECISION 370, the audit event creator 260 compares the event object to various audit criteria to determine whether one or more data contained in the event object satisfy the audit criteria. For example, for an event object measuring a standard deviation from a mean time between transmissions and a total data transmitted from a given source to a given destination, a first criterion sets a threshold for the standard deviation to fall below, while a second criterion sets a threshold amount of data that can be transmitted before the criterion is satisfied. In another example, for an event object tracking command line instructions, audit criteria may specify various commands that are blacklisted (or blacklisted for a given user or process 130) that will satisfy the audit criteria when the line instructions match an entry on the blacklist. When an audit criterion is satisfied, method 300 may proceed to OPERATION 380, otherwise method 300 may conclude.

At OPERATION 380 an audit event is created for the event object by the audit event creator 260. In various aspects, the audit event may comprise passing the event object (or its identifying information) to an audit event ingestor 280, signaling an audit event ingestor 280 to examine the audit even persistor 270, or taking ameliorative action regarding the process 130 associated with the event object (i.e., the event creator 210). In various aspects, ameliorative actions include terminating the process 130, quarantining the process 130, initiating a debugger or virus scanner process 130, flagging the process 130 for further review, and transmitting an alert to a remote device. Method 300 may then conclude.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
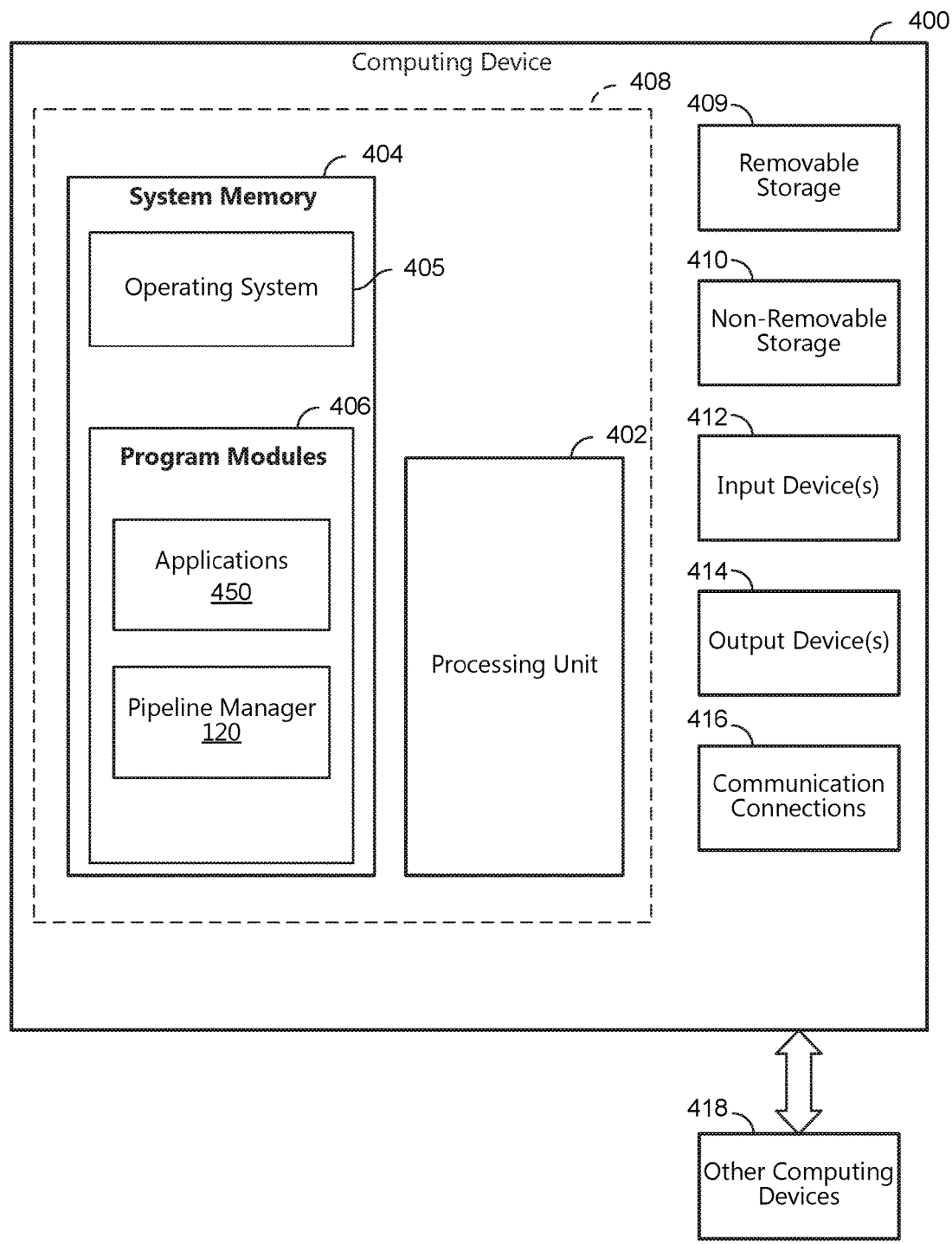
FIG. 4 is a block diagram illustrating example physical components of a computing device.

FIG. 4 and the associated descriptions provide a discussion of a variety of operating environments in which examples are practiced. However, the devices and systems illustrated and discussed with respect to FIG. 4 are for purposes of example and illustration and are not limiting of a vast number of computing device configurations that are used for practicing aspects, described herein.

FIG. 4 is a block diagram illustrating physical components (i.e., hardware) of a computing device 400 with which examples of the present disclosure may be practiced. In a basic configuration, the computing device 400 includes at least one processing unit 402 and a system memory 404. According to an aspect, depending on the configuration and type of computing device, the system memory 404 comprises, but is not limited to, volatile storage (e.g., random access memory), non-volatile storage (e.g., read-only memory), flash memory, or any combination of such memories. According to an aspect, the system memory 404 includes an operating system 405 and one or more program modules 406 suitable for running software applications 450. According to an aspect, the system memory 404 includes the pipeline manager 120, the processes 130, and the modules discussed in regard to FIG. 2. The operating system 405, for example, is suitable for controlling the operation of the computing device 400. Furthermore, aspects are practiced in conjunction with a graphics library, other operating systems, or any other application program, and are not limited to any particular application or system. This basic configuration is illustrated in FIG. 4 by those components within a dashed line 408. According to an aspect, the computing device 400 has additional features or functionality. For example, according to an aspect, the computing device 400 includes additional data storage devices (removable and/or non-removable) such as, for example, magnetic disks, optical disks, or tape. Such additional storage is illustrated in FIG. 4 by a removable storage device 409 and a non-removable storage device 410.

As stated above, according to an aspect, a number of program modules and data files are stored in the system memory 404. While executing on the processing unit 402, the program modules 406 (e.g., pipeline manager 120, process 130) perform processes including, but not limited to, one or more of the stages of the method 300 illustrated in FIG. 3. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 400 has one or more input device(s) 412 such as a keyboard, a mouse, a pen, a sound input device, a touch input device, etc. The output device(s) 414 such as a display, speakers, a printer, etc. are also included according to an aspect. The aforementioned devices are examples and others may be used. According to an aspect, the computing device 400 includes one or more communication connections 416 allowing communications with other computing devices 418. Examples of suitable communication connections 416 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. According to an aspect, any such computer storage media is part of the computing device 400. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method for improving a network by employing a modular event pipeline on servers within the network, comprising:
    defining the modular pipeline in a modifiable configuration file to include at least an event ingestor module, an event filter module, an event processor module, and an audit event creator module, wherein connections between modules are also defined within the modifiable configuration file;
    executing the modular pipeline in accordance with the modifiable configuration file on a server, the execution including:
        detecting, with the event ingestor module, an event originating on the given server;
        determining, with the event filter module, whether the event is relevant to the event processor module;
        in response to determining that the event is relevant to the event processor module, providing the event to the event processor module;
        determining, with the event processor module, whether the event matches an existing event object based on identifying information included in the event;
        in response to determining that the identifying information matches the existing event object, updating, with the event processor module, the existing event object based on the event;
        determining, with the audit event creator module, whether the existing event object satisfies an audit criterion;
        in response to determining that the existing event object satisfies the audit criterion, generating, with the audit event creator module, an audit event.

2. The method of claim 1, further comprising:
    in response to determining that the identifying information does not match the existing event object, creating, with the event processor module, a new event object based on the event.

3. The method of claim 1, further comprising:
in response to generating the audit event, deleting, with the audit event creator module, the existing event object.

4. A system for improving a network by employing a modular event pipeline on servers within the network, comprising:
a processing unit; and
a system memory including instructions, the instructions including a modifiable configuration file that defines the modular pipeline as including a plurality of modules comprising an event ingestor, an event pre-filter, a data block sender, an event processor, an audit event creator, and an audit event persistor, the modifiable configuration file further defining connections between the modules of the modular pipeline, the instructions, which when executed by the processing unit are operable to provide:
the event ingestor, operable to observe events occurring on a given server;
the event pre-filter, operable to filter the observed events into a subset based on filtering criteria;
the data block sender, operable to provide a trace for the filtered events, wherein the trace provides identifying information for the filtered events and timestamps for the filtered events;
the event processor, operable to receive the trace to monitor the events via an event object associated with a given event by the identifying information across times based on the timestamps, wherein the event object aggregates across the times the events matching the identifying information;
the audit event creator, operable monitor the event object based on an audit criterion to create an audit event in response to the event object satisfying the audit criterion; and
the audit event persistor, operable to maintain the audit event for consumption by an audit event ingestor.

5. The system of claim 4, wherein when the event ingestor and a second event ingestor observe the given event in common, the event pre-filter is further operable to pass a single observation of the given event to the data block sender.

6. The system of claim 4, wherein the given event is included in multiple traces.

7. The system of claim 4, wherein the event processor receives multiple traces from multiple associated data block senders to produce the event object.

8. The system of claim 4, wherein the audit event is transmitted by the audit event persistor to the audit event ingestor, wherein the audit event ingestor is provided by a different device within the network.

9. The system of claim 4, wherein the event object is deleted in response to a process associated with the given event monitored by the event object terminating.

10. The system of claim 4, wherein the configuration file is modified to reconfigure the modular pipeline.

11. The system of claim 10, wherein modification of the configuration file occurs while the modular pipeline is being executed by the server without recompilation of the configuration file.

12. The system of claim 11, wherein modification of the configuration file includes an addition of a new module to the modular pipeline.

13. The system of claim 11, wherein modification of the configuration file includes a modification of the connections between modules.

14. A computer readable storage device including instructions for improving a network by employing a modular event pipeline on servers within the network, the instructions including a modifiable configuration file that defines the modular pipeline as including a plurality of modules comprising an event ingestor, an event pre-filter, a data block sender, an event processor and an audit event creator, the modifiable configuration file further defining connections between the modules of the modular pipeline, the instructions, comprising:
detecting, by the event ingestor running on a given server, an event originating on a given server, wherein the event ingestor notes a process that generated the event and a target of the event;
pre-filtering, with the event pre-filter, the detected event based on an event type;
creating, with the data block sender, a trace for the pre-filtered event by noting a time at which the pre-filtered event was detected;
determining, at the event processor, which is associated with the event type running on the given server, whether an existing event object includes identifying information specifying a process/target pair that matches the noted process and the noted target of the event;
in response to determining that the identifying information matches, updating, with the event processor, the existing event object based on the event;
determining, with the audit event creator, whether the existing event object satisfies an audit criterion; and
in response to determining that the existing event object satisfies the audit criterion, generating an audit event with the audit event creator.

15. The computer readable storage device of claim 14, further comprising:
in response to determining that the identifying information does not match, creating, with the event processor, a new event object based on the event.

16. The computer readable storage device of claim 14, wherein the existing event object maintains a running calculation aggregated from multiple events received over a period of time that share the identifying information.

17. The computer readable storage device of claim 14, wherein the event ingestor comprises a first and a second event ingestor, and wherein the first event ingestor and the second ingestor detect a given event, and, wherein, pre-filtering the detected event, with the pre-filter, includes providing a single observation of the detected event for which to create the trace.

18. The computer readable storage device of claim 14, wherein a given event is included in a first trace and a second trace.

19. The computer readable storage device of claim 14, wherein the existing event object is deleted in response to generating the audit event or the process that generated the event terminating.

20. The computer readable storage device of claim 14, wherein the audit event quarantines the process that generated the event.

* * * * *